US011847385B2

(12) United States Patent
Shen et al.

(10) Patent No.: US 11,847,385 B2
(45) Date of Patent: Dec. 19, 2023

(54) VARIABLE SYSTEM FOR SIMULATING OPERATION OF AUTONOMOUS VEHICLES

(71) Applicant: Beijing Voyager Technology Co., Ltd., Beijing (CN)

(72) Inventors: Yuzhu Shen, Santa Clara, CA (US); Marc Sunet, Santa Clara, CA (US)

(73) Assignee: Beijing Voyager Technology Co., Ltd., Beijing (CN)

(*) Notice: Subject to any disclaimer, the term of this patent is extended or adjusted under 35 U.S.C. 154(b) by 292 days.

(21) Appl. No.: 17/138,682

(22) Filed: Dec. 30, 2020

(65) Prior Publication Data

US 2022/0207208 A1 Jun. 30, 2022

(51) Int. Cl.
*G06F 30/20* (2020.01)
*B60W 60/00* (2020.01)
*G06F 30/15* (2020.01)
*G06F 111/00* (2020.01)
*G06F 30/28* (2020.01)
*G06F 119/22* (2020.01)
*G06F 30/27* (2020.01)
*G06F 30/25* (2020.01)

(52) U.S. Cl.
CPC .......... *G06F 30/20* (2020.01); *B60W 60/001* (2020.02); *G06F 30/15* (2020.01); *G06F 30/25* (2020.01); *G06F 30/27* (2020.01); *G06F 30/28* (2020.01); *G06F 2111/00* (2020.01); *G06F 2119/22* (2020.01)

(58) Field of Classification Search
CPC .......... G06F 30/20; G06F 30/15; G06F 30/25; G06F 30/27; G06F 30/28; G06F 2111/00; G06F 2119/22; B60W 60/001
See application file for complete search history.

(56) References Cited

U.S. PATENT DOCUMENTS

| | | | | |
|---|---|---|---|---|
| 6,289,502 | B1* | 9/2001 | Garland | G06F 11/3608 717/114 |
| 10,156,850 | B1* | 12/2018 | Ansari | B60W 30/0953 |
| 2019/0146492 | A1* | 5/2019 | Phillips | G05B 13/041 701/23 |
| 2020/0209861 | A1* | 7/2020 | Priyadarshi | G05B 17/02 |
| 2021/0097148 | A1* | 4/2021 | Bagschik | G06F 30/20 |
| 2021/0286925 | A1* | 9/2021 | Wyrwas | G06V 10/82 |
| 2021/0347372 | A1* | 11/2021 | Bagschik | G06F 17/18 |

* cited by examiner

*Primary Examiner* — Kibrom K Gebresilassie
(74) *Attorney, Agent, or Firm* — Knobbe, Martens, Olson & Bear, LLP

(57) ABSTRACT

Embodiments of a variable system for simulating the operation of an autonomous system, such as an autonomous vehicle, are disclosed. A layered approach for defining variables can allow changing the specification of those variables under the rules of override and refinement, while leaving the software components that query those variables at runtime unaffected. The variable system can facilitate, among others, deterministic sampling of variables, simulation variations, noise injection, and realistic message timing. These applications can make the simulator more expressive and more powerful by virtue of being able to test the same scenario under many different conditions. As a result, more exhaustive testing can be performed without requiring user intervention and without having to change the individual software components of the simulator.

20 Claims, 9 Drawing Sheets

410 { Scenario_layer [
  "timing_delay" = [1, 2, 3, 4, 5]
  "position_noise" = Normal(mean=0, standard deviation=1); override = True;
                                                          ⏟
                                                          412
]

420 { Scene_layer [
  "vehicle_speed" = [3, 15]
]

430 { Configuration_layer = [
  "position_noise" = Normal (mean=0, standard deviation=2)
]

FIG. 4

VARIABLE SYSTEM FOR SIMULATING OPERATION OF AUTONOMOUS VEHICLES

INCORPORATION BY REFERENCE TO ANY PRIORITY APPLICATIONS

This application is being filed on Dec. 30, 2020, the same date as U.S. application Ser. No. 17/138,706, which is titled "DETERMINISTIC SAMPLING OF AUTONOMOUS VEHICLE SIMULATION VARIABLES AT RUNTIME" and is hereby expressly incorporated by reference herein in its entirety for all purposes. Any and all applications, if any, for which a foreign or domestic priority claim is identified in the Application Data Sheet of the present application are hereby incorporated by reference in their entireties under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Vehicles—such as vehicles used for ride-sharing purposes, vehicles that provide driver-assist functionality, and/or automated or autonomous vehicles (AVs)—may obtain and process sensor data using an on-board data processing system to perform a variety of functions. For example, functions can include determining and/or displaying navigational routes, identifying road signs, detecting objects and/or road obstructions, controlling vehicle operation, and/or the like. Rigorous testing of AVs is important to ensure correctness of the operation, safety, etc. There is a need for improved systems and methods for the testing of AVs.

SUMMARY

Certain aspects of the disclosure are directed to a variable system for simulating the operation of an autonomous system, such as an autonomous vehicle. A layered approach for defining variables can allow changing the specification of those variables under the rules of override and refinement, while leaving the software components that query those variables at runtime unaffected. The variable system can allow defining variables in various components of simulation in a type-safe manner. The variable system can facilitate one or more of deterministic sampling of variables, simulation variations, noise injection, and realistic message timing. These applications can make the simulator more expressive and more powerful by virtue of being able to test the same scenario under many different conditions. As a result, more exhaustive testing can be performed efficiently. These benefits can be achieved while making the system easily manageable by the engineers, without requiring user intervention, and without having to change the individual software components of the simulator.

BRIEF DESCRIPTION OF THE DRAWINGS

FIG. 4 illustrates an example of layers of a variable system, according to certain aspects of the present disclosure.

DETAILED DESCRIPTION

In the development of AVs, simulation is important for testing the operation of an AV easily, safely, and at scale before performing more expensive and time-consuming road tests. Generally, a simulator is given the specification of a simulation and runs the simulation to produce an outcome. The outcome is then evaluated under different metrics to determine whether the simulation is satisfactory.

One of the challenges with simulation is the expressiveness of the simulation's specifications. A specification can provide the simulator with inputs, such as the map, other agents on the road and their behavior, the behavior of the ego vehicle, etc. The number of specifications can easily grow into the many thousands and have the potential for being highly redundant. Ideally, the specification can describe not just one specific instance of a simulation, but a family of such instances. For example, with a single specification, it may be useful to perform perturbations to the behavior of other agents, such as their speeds or trajectories, changing the weather conditions, changing the time of day, performing perturbations to the output of software components to simulate noise and errors, etc. Such expressiveness should be implemented while maintaining the simulator's basic properties of accuracy, speed, and determinism. The expressiveness should also be balanced with ease of use so that engineers can easily manage the many simulation specifications.

Disclosed are embodiments of a variable system that solves these and other problems of simulating the operation of AVs. In an example, the variable system allows for the encoding of variables in different components of simulation and then assigning those variables different values at runtime. This allows the behavior of the simulation to change without having to change the software or without user input to change the simulation parameters, thereby making the simulator more expressive and more exhaustive in the test coverage.

Detailed descriptions and examples of systems and methods according to one or more illustrative embodiments of the present disclosure may be found, at least, in the sections entitled Variable System, Simulation Variations, and Applications of the Variable System, as well as in the section entitled Example Embodiments, and also in FIGS. 2-8 herein. Furthermore, components and functionality for an AV whose operation is being or has been tested using embodiments of the variable system may be configured and/or incorporated into the networked vehicle environment 100 described herein in FIGS. 1A-1B.

Various embodiments described herein are intimately tied to, enabled by, and would not exist except for, vehicle and/or computer technology. For example, the variable system and simulation described herein in reference to various embodiments cannot reasonably be performed by humans alone, without the vehicle and/or computer technology upon which they are implemented.

Networked Vehicle Environment

Figure 1A:
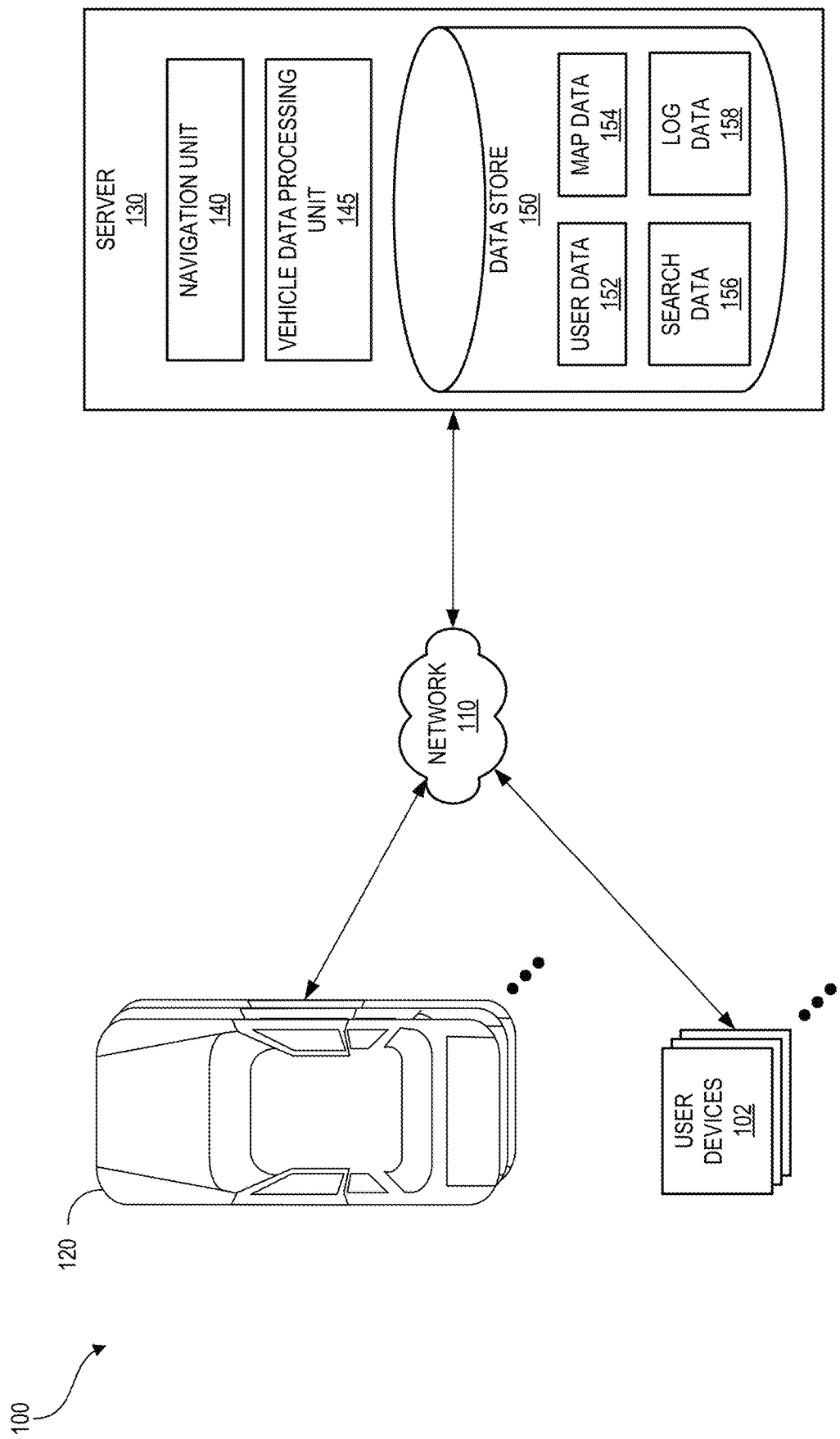
FIG. 1A illustrates a block diagram of a networked vehicle environment in which one or more vehicles and/or one or more user devices interact with a server via a network, according to certain aspects of the present disclosure.

FIG. 1A illustrates a block diagram of a networked vehicle environment 100 in which one or more vehicles 120 and/or one or more user devices 102 interact with a server 130 via a network 110, according to certain aspects of the present disclosure. For example, the vehicles 120 may be equipped to provide ride-sharing and/or other location-based services, to assist drivers in controlling vehicle operation (e.g., via various driver-assist features, such as adaptive and/or regular cruise control, adaptive headlight control, anti-lock braking, automatic parking, night vision, blind spot monitor, collision avoidance, crosswind stabilization, driver drowsiness detection, driver monitoring system, emergency driver assistant, intersection assistant, hill descent control, intelligent speed adaptation, lane centering, lane departure warning, forward, rear, and/or side parking sensors, pedestrian detection, rain sensor, surround view system, tire pressure monitor, traffic sign recognition, turning assistant, wrong-way driving warning, traffic condition alerts, etc.), and/or to fully control vehicle operation. Thus, the vehicles 120 can be regular gasoline, natural gas, biofuel, electric, hydrogen, etc. vehicles configured to offer ride-sharing and/or other location-based services, vehicles that provide driver-assist functionality (e.g., one or more of the driver-assist features described herein), and/or automated or autonomous vehicles (AVs). The vehicles 120 can be automobiles, trucks, vans, buses, motorcycles, scooters, bicycles, and/or any other motorized vehicle.

The server 130 can communicate with the vehicles 120 to obtain vehicle data, such as route data, sensor data, perception data, vehicle 120 control data, vehicle 120 component fault and/or failure data, etc. The server 130 can process and store the vehicle data for use in other operations performed by the server 130 and/or another computing system (not shown). Such operations can include running diagnostic models to identify vehicle 120 operational issues (e.g., the cause of vehicle 120 navigational errors, unusual sensor readings, an object not being identified, vehicle 120 component failure, etc.); running models to simulate vehicle 120 performance given a set of variables; identifying objects that cannot be identified by a vehicle 120, generating control instructions that, when executed by a vehicle 120, cause the vehicle 120 to drive and/or maneuver in a certain manner along a specified path; and/or the like.

The server 130 can also transmit data to the vehicles 120. For example, the server 130 can transmit map data, firmware and/or software updates, vehicle 120 control instructions, an identification of an object that could not otherwise be identified by a vehicle 120, passenger pickup information, traffic data, and/or the like.

In addition to communicating with one or more vehicles 120, the server 130 can communicate with one or more user devices 102. In particular, the server 130 can provide a network service to enable a user to request, via an application running on a user device 102, location-based services (e.g., transportation services, such as ride-sharing services). For example, the user devices 102 can correspond to a computing device, such as a smart phone, tablet, laptop, smart watch, or any other device that can communicate over the network 110 with the server 130. A user device 102 can execute an application, such as a mobile application, that the user operating the user device 102 can use to interact with the server 130. For example, the user device 102 can communicate with the server 130 to provide location data and/or queries to the server 130, to receive map-related data and/or directions from the server 130, and/or the like.

The server 130 can process requests and/or other data received from user devices 102 to identify service providers (e.g., vehicle 120 drivers) to provide the requested services for the users. In addition, the server 130 can receive data—such as user trip pickup or destination data, user location query data, etc.—based on which the server 130 identifies a region, an address, and/or other location associated with the various users. The server 130 can then use the identified location to provide services providers and/or users with directions to a determined pickup location.

The application running on the user device 102 may be created and/or made available by the same entity responsible for the server 130. Alternatively, the application running on the user device 102 can be a third-party application that includes features (e.g., an application programming interface or software development kit) that enables communications with the server 130.

A single server 130 is illustrated in FIG. 1A for simplicity and ease of explanation. It is appreciated, however, that the server 130 may be a single computing device, or may include multiple distinct computing devices logically or physically grouped together to collectively operate as a server system. The components of the server 130 can be implemented in application-specific hardware (e.g., a server computing device with one or more ASICs) such that no software is necessary, or as a combination of hardware and software. In addition, the modules and components of the server 130 can be combined on one server computing device or separated individually or into groups on several server computing devices. The server 130 may include additional or fewer components than illustrated in FIG. 1A.

The network 110 includes any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet. The network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The server 130 can include a navigation unit 140, a vehicle data processing unit 145, and a data store 150. The navigation unit 140 can assist with location-based services. For example, the navigation unit 140 can facilitate the transportation of a user (also referred to herein as a "rider") and/or an object (e.g., food, packages, etc.) by another user (also referred to herein as a "driver") from a first location (also referred to herein as a "pickup location") to a second location (also referred to herein as a "destination location"). The navigation unit 140 may facilitate user and/or object transportation by providing map and/or navigation instructions to an application running on a user device 102 of a rider, to an application running on a user device 102 of a driver, and/or to a navigational system running on a vehicle 120.

As an example, the navigation unit 140 can include a matching service (not shown) that pairs a rider requesting a trip from a pickup location to a destination location with a driver that can complete the trip. The matching service may interact with an application running on the user device 102 of the rider and/or an application running on the user device 102 of the driver to establish the trip for the rider and/or to process payment from the rider to the driver.

The navigation unit 140 can also communicate with the application running on the user device 102 of the driver during the trip to obtain trip location information from the user device 102 (e.g., via a global position system (GPS) component coupled to and/or embedded within the user device 102) and provide navigation directions to the application that aid the driver in traveling from the current location of the driver to the destination location. The navigation unit 140 can also direct the driver to various geographic locations or points of interest, regardless of whether the driver is carrying a rider.

The vehicle data processing unit 145 can be configured to support vehicle 120 driver-assist features and/or to support autonomous driving. For example, the vehicle data processing unit 145 can generate and/or transmit to a vehicle 120 map data, run diagnostic models to identify vehicle 120 operational issues, run models to simulate vehicle 120 performance given a set of variables, use vehicle data provided by a vehicle 120 to identify an object and transmit an identification of the object to the vehicle 120, generate and/or transmit to a vehicle 120 vehicle 120 control instructions, and/or the like.

The data store 150 can store various types of data used by the navigation unit 140, the vehicle data processing unit 145, the user devices 102, and/or the vehicles 120. For example, the data store 150 can store user data 152, map data 154, search data 156, and log data 158.

The user data 152 may include information on some or all of the users registered with a location-based service, such as drivers and riders. The information may include, for example, usernames, passwords, names, addresses, billing information, data associated with prior trips taken or serviced by a user, user rating information, user loyalty program information, and/or the like.

The map data 154 may include high definition (HD) maps generated from sensors (e.g., light detection and ranging (LiDAR) sensors, radio detection and ranging (RADAR) sensors, infrared cameras, visible light cameras, stereo cameras, an inertial measurement unit (IMU), etc.), satellite imagery, optical character recognition (OCR) performed on captured street images (e.g., to identify names of streets, to identify street sign text, to identify names of points of interest, etc.), etc.; information used to calculate routes; information used to render 2D and/or 3D graphical maps; and/or the like. For example, the map data 154 can include elements like the layout of streets and intersections, bridges (e.g., including information on the height and/or width of bridges over streets), off-ramps, buildings, parking structure entrances and exits (e.g., including information on the height and/or width of the vehicle entrances and/or exits), the placement of street signs and stop lights, emergency turn-offs, points of interest (e.g., parks, restaurants, fuel stations, attractions, landmarks, etc., and associated names), road markings (e.g., centerline markings dividing lanes of opposing traffic, lane markings, stop lines, left turn guide lines, right turn guide lines, crosswalks, bus lane markings, bike lane markings, island marking, pavement text, highway exist and entrance markings, etc.), curbs, rail lines, waterways, turning radiuses and/or angles of left and right turns, the distance and dimensions of road features, the placement of barriers between two-way traffic, and/or the like, along with the elements' associated geographical locations (e.g., geographical coordinates). The map data 154 can also include reference data, such as real-time and/or historical traffic information, current and/or predicted weather conditions, road work information, information regarding laws and regulations (e.g., speed limits, whether right turns on red lights are permitted or prohibited, whether U-turns are permitted or prohibited, permitted direction of travel, and/or the like), news events, and/or the like.

While the map data 154 is illustrated as being stored in the data store 150 of the server 130, this is not meant to be limiting. For example, the server 130 can transmit the map data 154 to a vehicle 120 for storage therein (e.g., in the data store 129, described below).

The search data 156 can include searches entered by various users in the past. For example, the search data 156 can include textual searches for pickup and/or destination locations. The searches can be for specific addresses, geographical locations, names associated with a geographical location (e.g., name of a park, restaurant, fuel station, attraction, landmark, etc.), etc.

The log data 158 can include vehicle data provided by one or more vehicles 120. For example, the vehicle data can include route data, sensor data, perception data, vehicle 120 control data, vehicle 120 component fault and/or failure data, etc.

Figure 1B:
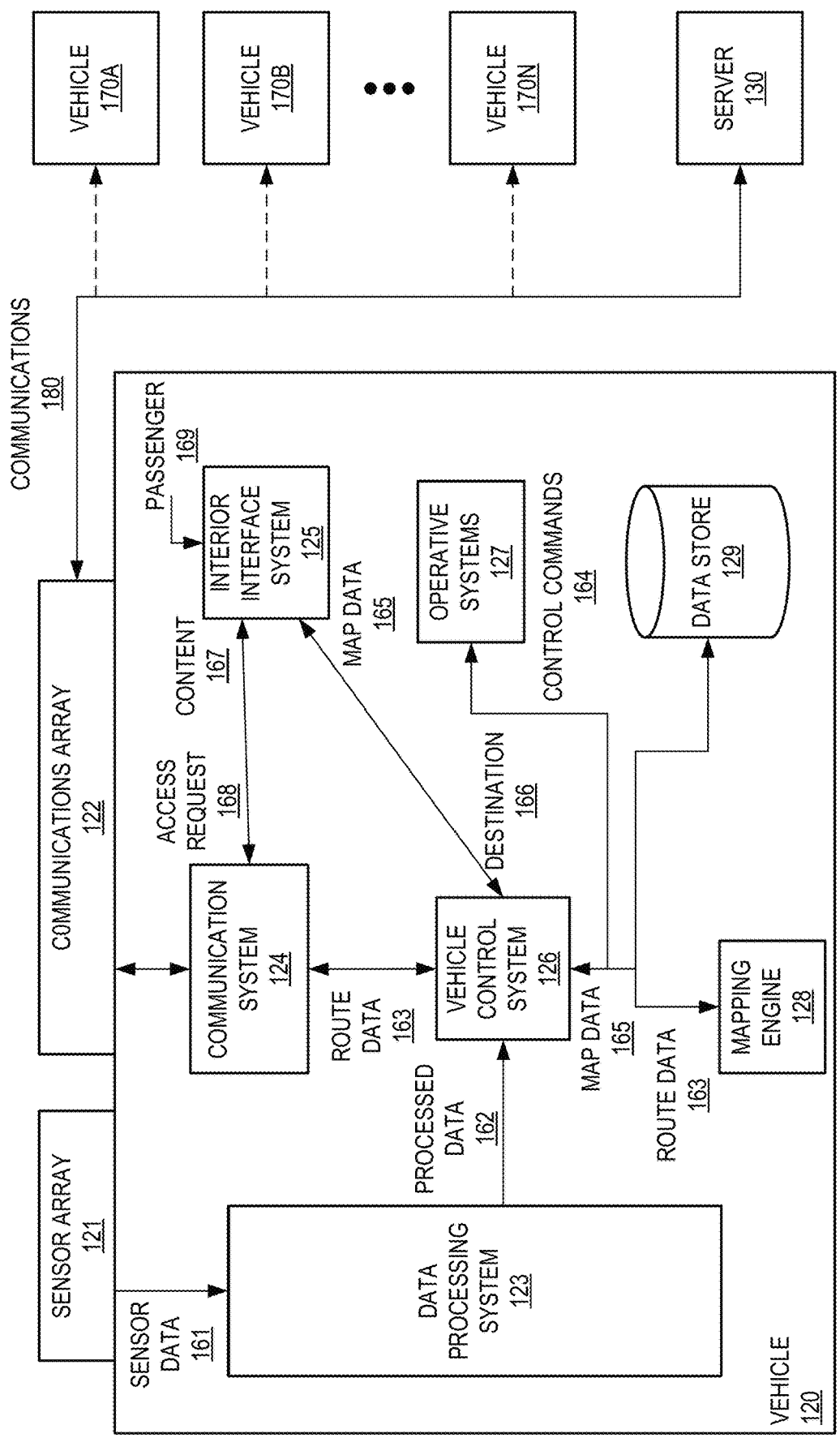
FIG. 1B illustrates a block diagram showing the vehicle of FIG. 1A in communication with one or more other vehicles and/or the server of FIG. 1A, according to certain aspects of the present disclosure.

FIG. 1B illustrates a block diagram showing the vehicle 120 of FIG. 1A in communication with one or more other vehicles 170A-N and/or the server 130 of FIG. 1A, according to certain aspects of the present disclosure. As illustrated in FIG. 1B, the vehicle 120 can include various components and/or data stores. For example, the vehicle 120 can include a sensor array 121, a communications array 122, a data processing system 123, a communication system 124, an interior interface system 125, a vehicle control system 126, operative systems 127, a mapping engine 128, and/or a data store 129.

Communications 180 may be transmitted and/or received between the vehicle 120, one or more vehicles 170A-N, and/or the server 130. The server 130 can transmit and/or receive data from the vehicle 120 as described above with respect to FIG. 1A. For example, the server 130 can transmit vehicle control instructions or commands (e.g., as communications 180) to the vehicle 120. The vehicle control instructions can be received by the communications array 122 (e.g., an array of one or more antennas configured to transmit and/or receive wireless signals), which is operated by the communication system 124 (e.g., a transceiver). The communication system 124 can transmit the vehicle control instructions to the vehicle control system 126, which can operate the acceleration, steering, braking, lights, signals, and other operative systems 127 of the vehicle 120 in order to drive and/or maneuver the vehicle 120 and/or assist a driver in driving and/or maneuvering the vehicle 120 through road traffic to destination locations specified by the vehicle control instructions.

As an example, the vehicle control instructions can include route data 163, which can be processed by the vehicle control system 126 to maneuver the vehicle 120 and/or assist a driver in maneuvering the vehicle 120 along a given route (e.g., an optimized route calculated by the server 130 and/or the mapping engine 128) to the specified destination location. In processing the route data 163, the vehicle control system 126 can generate control commands 164 for execution by the operative systems 127 (e.g., acceleration, steering, braking, maneuvering, reversing, etc.) to cause the vehicle 120 to travel along the route to the destination location and/or to assist a driver in maneuvering the vehicle 120 along the route to the destination location.

A destination location 166 may be specified by the server 130 based on user requests (e.g., pickup requests, delivery requests, etc.) transmitted from applications running on user devices 102. Alternatively or in addition, a passenger and/or driver of the vehicle 120 can provide user input(s) 169 through an interior interface system 125 (e.g., a vehicle navigation system) to provide a destination location 166. The vehicle control system 126 can transmit the inputted destination location 166 and/or a current location of the vehicle 120 (e.g., as a GPS data packet) as a communication 180 to the server 130 via the communication system 124 and the communications array 122. The server 130 (e.g., the navigation unit 140) can use the current location of the vehicle 120 and/or the inputted destination location 166 to perform an optimization operation to determine an optimal route for the vehicle 120 to travel to the destination location 166. Route data 163 that includes the optimal route can be transmitted from the server 130 to the vehicle control system 126 via the communications array 122 and the communication system 124. As a result of receiving the route data 163, the vehicle control system 126 can cause the operative systems 127 to maneuver the vehicle 120 through traffic to the destination location 166 along the optimal route, assist a driver in maneuvering the vehicle 120 through traffic to the destination location 166 along the optimal route, and/or cause the interior interface system 125 to display and/or present instructions for maneuvering the vehicle 120 through traffic to the destination location 166 along the optimal route.

Alternatively or in addition, the route data 163 includes the optimal route and the vehicle control system 126 automatically inputs the route data 163 into the mapping engine 128. The mapping engine 128 can generate map data 165 using the optimal route (e.g., generate a map showing the optimal route and/or instructions for taking the optimal route) and provide the map data 165 to the interior interface system 125 (e.g., via the vehicle control system 126) for display. The map data 165 may include information derived from the map data 154 stored in the data store 150 on the server 130. The displayed map data 165 can indicate an estimated time of arrival and/or show the progress of the vehicle 120 along the optimal route. The displayed map data 165 can also include indicators, such as reroute commands, emergency notifications, road work information, real-time traffic data, current weather conditions, information regarding laws and regulations (e.g., speed limits, whether right turns on red lights are permitted or prohibited, where U-turns are permitted or prohibited, permitted direction of travel, etc.), news events, and/or the like.

The user input 169 can also be a request to access a network (e.g., the network 110). In response to such a request, the interior interface system 125 can generate an access request 168, which can be processed by the communication system 124 to configure the communications array 122 to transmit and/or receive data corresponding to a user's interaction with the interior interface system 125 and/or with a user device 102 in communication with the interior interface system 125 (e.g., a user device 102 connected to the interior interface system 125 via a wireless connection). For example, the vehicle 120 can include on-board Wi-Fi, which the passenger(s) and/or driver can access to send and/or receive emails and/or text messages, stream audio and/or video content, browse content pages (e.g., network pages, web pages, etc.), and/or access applications that use network access. Based on user interactions, the interior interface system 125 can receive content 167 via the network 110, the communications array 122, and/or the communication system 124. The communication system 124 can dynamically manage network access to avoid or minimize disruption of the transmission of the content 167.

The sensor array 121 can include any number of one or more types of sensors, such as a satellite-radio navigation system (e.g., GPS), a LiDAR sensor, a landscape sensor (e.g., a radar sensor), an IMU, a camera (e.g., an infrared camera, a visible light camera, stereo cameras, etc.), a Wi-Fi detection system, a cellular communication system, an inter-vehicle communication system, a road sensor communication system, feature sensors, proximity sensors (e.g., infra-red, electromagnetic, photoelectric, etc.), distance sensors, depth sensors, and/or the like. The satellite-radio navigation system may compute the current position (e.g., within a range of 1-10 meters) of the vehicle 120 based on an analysis of signals received from a constellation of satellites.

The LiDAR sensor, the radar sensor, and/or any other similar types of sensors can be used to detect the vehicle 120 surroundings while the vehicle 120 is in motion or about to begin motion. For example, the LiDAR sensor may be used to bounce multiple laser beams off approaching objects to assess their distance and to provide accurate 3D information on the surrounding environment. The data obtained from the LiDAR sensor may be used in performing object identification, motion vector determination, collision prediction, and/or in implementing accident avoidance processes. Optionally, the LiDAR sensor may provide a 360° view using a rotating, scanning mirror assembly. The LiDAR sensor may optionally be mounted on a roof of the vehicle 120.

The IMU may include X, Y, Z oriented gyroscopes and/or accelerometers. The IMU provides data on the rotational and linear motion of the vehicle 120, which may be used to calculate the motion and position of the vehicle 120.

Cameras may be used to capture visual images of the environment surrounding the vehicle 120. Depending on the configuration and number of cameras, the cameras may provide a 360° view around the vehicle 120. The images from the cameras may be used to read road markings (e.g., lane markings), read street signs, detect objects, and/or the like.

The Wi-Fi detection system and/or the cellular communication system may be used to perform triangulation with respect to Wi-Fi hot spots or cell towers respectively, to determine the position of the vehicle 120 (optionally in conjunction with then satellite-radio navigation system).

The inter-vehicle communication system (which may include the Wi-Fi detection system, the cellular communication system, and/or the communications array 122) may be used to receive and/or transmit data to the other vehicles 170A-N, such as current speed and/or location coordinates of the vehicle 120, time and/or location coordinates corresponding to when deceleration is planned and the planned rate of deceleration, time and/or location coordinates when a stop operation is planned, time and/or location coordinates when a lane change is planned and direction of lane change, time and/or location coordinates when a turn operation is planned, time and/or location coordinates when a parking operation is planned, and/or the like.

The road sensor communication system (which may include the Wi-Fi detection system and/or the cellular communication system) may be used to read information from road sensors (e.g., indicating the traffic speed and/or traffic congestion) and/or traffic control devices (e.g., traffic signals).

When a user requests transportation (e.g., via the application running on the user device 102), the user may specify a specific destination location. The origination location may be the current location of the vehicle 120, which may be determined using the satellite-radio navigation system installed in the vehicle (e.g., GPS, Galileo, BeiDou/COMPASS, DORIS, GLONASS, and/or other satellite-radio navigation system), a Wi-Fi positioning System, cell tower triangulation, and/or the like. Optionally, the origination location may be specified by the user via a user interface provided by the vehicle 120 (e.g., the interior interface system 125) or via the user device 102 running the application. Optionally, the origination location may be automatically determined from location information obtained from the user device 102. In addition to the origination location and destination location, one or more waypoints may be specified, enabling multiple destination locations.

Raw sensor data 161 from the sensor array 121 can be processed by the on-board data processing system 123. The processed data 162 can then be sent by the data processing system 123 to the vehicle control system 126, and optionally sent to the server 130 via the communication system 124 and the communications array 122.

The data store 129 can store map data (e.g., the map data 154) and/or a subset of the map data 154 (e.g., a portion of the map data 154 corresponding to a general region in which the vehicle 120 is currently located). The vehicle 120 can use the sensor array 121 to record updated map data along traveled routes, and transmit the updated map data to the server 130 via the communication system 124 and the communications array 122. The server 130 can then transmit the updated map data to one or more of the vehicles 170A-N and/or further process the updated map data.

The data processing system 123 can provide continuous or near continuous processed data 162 to the vehicle control system 126 to respond to point-to-point activity in the surroundings of the vehicle 120. The processed data 162 can comprise comparisons between the raw sensor data 161—which represents an operational environment of the vehicle 120, and which is continuously collected by the sensor array 121—and the map data stored in the data store 129. In an example, the data processing system 123 is programmed with machine learning or other artificial intelligence capabilities to enable the vehicle 120 to identify and respond to conditions, events, and/or potential hazards. In variations, the data processing system 123 can continuously or nearly continuously compare raw sensor data 161 to stored map data in order to perform a localization to continuously or nearly continuously determine a location and/or orientation of the vehicle 120. Localization of the vehicle 120 may allow the vehicle 120 to become aware of an instant location and/or orientation of the vehicle 120 in comparison to the stored map data in order to maneuver the vehicle 120 on surface streets through traffic and/or assist a driver in maneuvering the vehicle 120 on surface streets through traffic and identify and respond to potential hazards (e.g., pedestrians) or local conditions, such as weather or traffic conditions.

Furthermore, localization can enable the vehicle 120 to tune or beam steer the communications array 122 to maximize a communication link quality and/or to minimize interference with other communications from other vehicles 170A-N. For example, the communication system 124 can beam steer a radiation patterns of the communications array 122 in response to network configuration commands received from the server 130. The data store 129 may store current network resource map data that identifies network base stations and/or other network sources that provide network connectivity. The network resource map data may indicate locations of base stations and/or available network types (e.g., 3G, 4G, LTE, Wi-Fi, etc.) within a region in which the vehicle 120 is located.

While FIG. 1B describes certain operations as being performed by the vehicle 120 or the server 130, this is not meant to be limiting. The operations performed by the vehicle 120 and the server 130 as described herein can be performed by either entity. For example, certain operations normally performed by the server 130 (e.g., transmitting updating map data to the vehicles 170A-N) may be performed by the vehicle 120 for load balancing purposes (e.g., to reduce the processing load of the server 130, to take advantage of spare processing capacity on the vehicle 120, etc.).

Furthermore, any of the vehicles 170A-N may include some or all of the components of the vehicle 120 described herein. For example, a vehicle 170A-N can include a communications array 122 to communicate with the vehicle 120 and/or the server 130.

Variable System

A testing scenario (or scenario) for an AV can include information needed to simulate the operation of the AV. A virtual scene (or scene) can describe the synthetic world in which the AV can be positioned and in which the AV can travel. The scene can be defined in three dimensions (3D) and may be created using a 3D simulator. A particular scenario can include the scene as well as data relating to the behavior of the AV and behavior of one or more agents (such as, other vehicles, pedestrians, etc.). The scenario can include a goal (or goals) for the AV, such as reaching a certain location in the scene within a certain period of time. Performance of such goal can be evaluated during the simulation. In some cases, the scenario can be stored in an editable document (such as, in a text file).

A scenario can include one or more variables. For instance, the scenario can be a parking lot, in which a maximum speed variable can be set. A scene can include one or more variables. For example, position of the AV in 3D coordinates (x, y, z), speed of an agent, or the like can be a variable in the scene.

Figure 2:
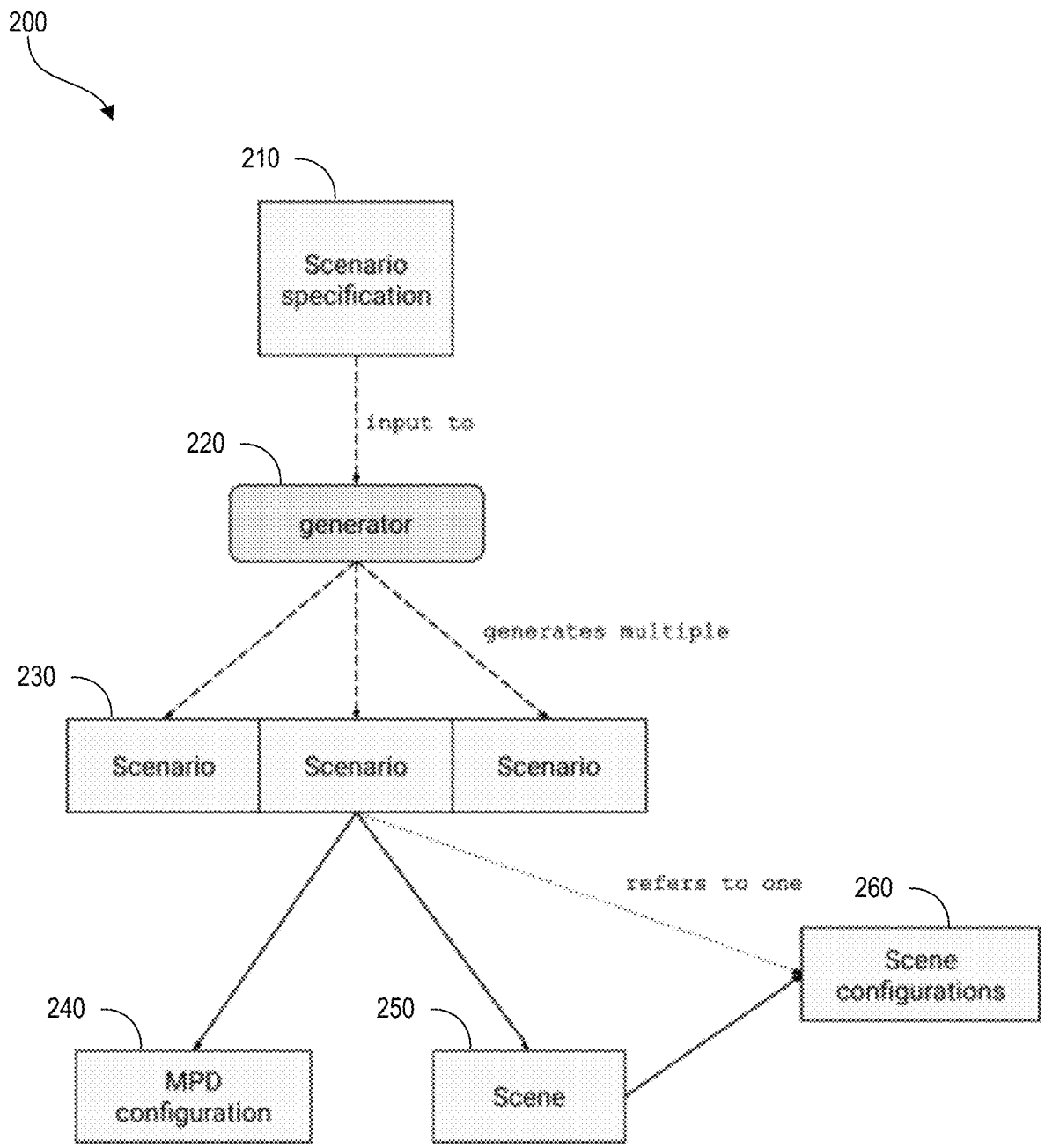
FIG. 2 illustrates a block diagram showing generation of testing scenarios, according to certain aspects of the present disclosure.

FIG. 2 illustrates a block diagram 200 showing generation of scenarios by the variable system, in accordance with some aspects. A scenario generator 220 can utilize as inputs a scenario specification 210 that can include one or more scenario variables, a scene 250 that can reference a scene configuration 260, which can include one or more scene variables, and message timing duration (MPD) configuration 240 that can include one or more variables for varying the timing of messages for communicating between various software components of an AV (as explained below). The scenario generator 220 can generate multiple scenarios 230 for simulating the operation of the AV. A first scenario can differ from a second scenario in that value(s) of variable(s) can be different in the first and second scenarios. Simulation may involve testing hundreds or even thousands of different scenarios.

During the simulation, it may be advantageous to change one or more variables across multiple scenarios, such as change the speed of the AV, change the timing of messages, or the like. With existing simulation systems, a user would need to make the desired change in each of the multiple scenarios, such as each of the scenarios 230 illustrated in FIG. 2. This can be time consuming, error prone, and inefficient.

A variable system can allow for the encoding of variables in different components of simulation and then assigning those variables different values during the simulation. Advantageously, this can allow the behavior of the simulation to change without having to change the underlying software components of the AV or requiring the user to make changes, thereby making the simulator more expressive and more exhaustive in its testing coverage.

In the variable system, variable specification can follow a layered approach, whereby the same variable can be defined in multiple layers. Specifications in the upper layers take precedence over specifications in the lower layers. This precedence can follow the rules of override or refinement. A variable specification in an upper layer can override that of the same variable in a lower layer. As a result, the specification of the lower layer can be ignored and that of the upper layer can be used during the simulation. A variable specification in an upper layer can refine the specification of the same variable in a lower layer. Refinement is similar to overriding, with the additional constraint that the upper layer specification's values are a subset of the lower layer's. For example, if the bottom definition defines a list [1, 2, 3, 4, 5], a top definition can refine the list to [3, 2, 5], [2, 4], [1], etc. (such as, all possible subsets with the order not being relevant). Overriding can allow a variable to change its specification completely, whereas refinement can also achieve this goal while ensuring that the new variable is well-defined or well-behaved in that its values are a subset of the original values.

In some implementations, a variable can be defined or declared with a name, data type (such as, integer, double, etc.), form (such as, constant, list, range, uniform distribution, normal distribution, etc.), and an override/refinement flag. The variable system can use name spacing to segregate variables from different software components (which may be created by different engineering teams) so that two otherwise identically-named variables do not collide. This can be important in the context of override and refinement, as otherwise a variable in an upper layer might accidentally override a variable from a different component but under the same name in a lower layer. For example, name of a variable X that utilizes name spacing can be "perception/X" and "localization/X," which utilizes the names of software components for the perception and localization systems. Other name spacing approaches can be used.

In some implementations, three layers of variable specifications can be utilized. A variable specification with the lowest priority (bottom layer) can be a variable configuration file. These variables can be defined outside of scene or scenario definitions. A variable specification with the middle priority (middle layer) can include variables declared or defined in virtual scenes. A variable specification with the highest priority (top layer) can include variables declared in scenarios.

Figure 3:
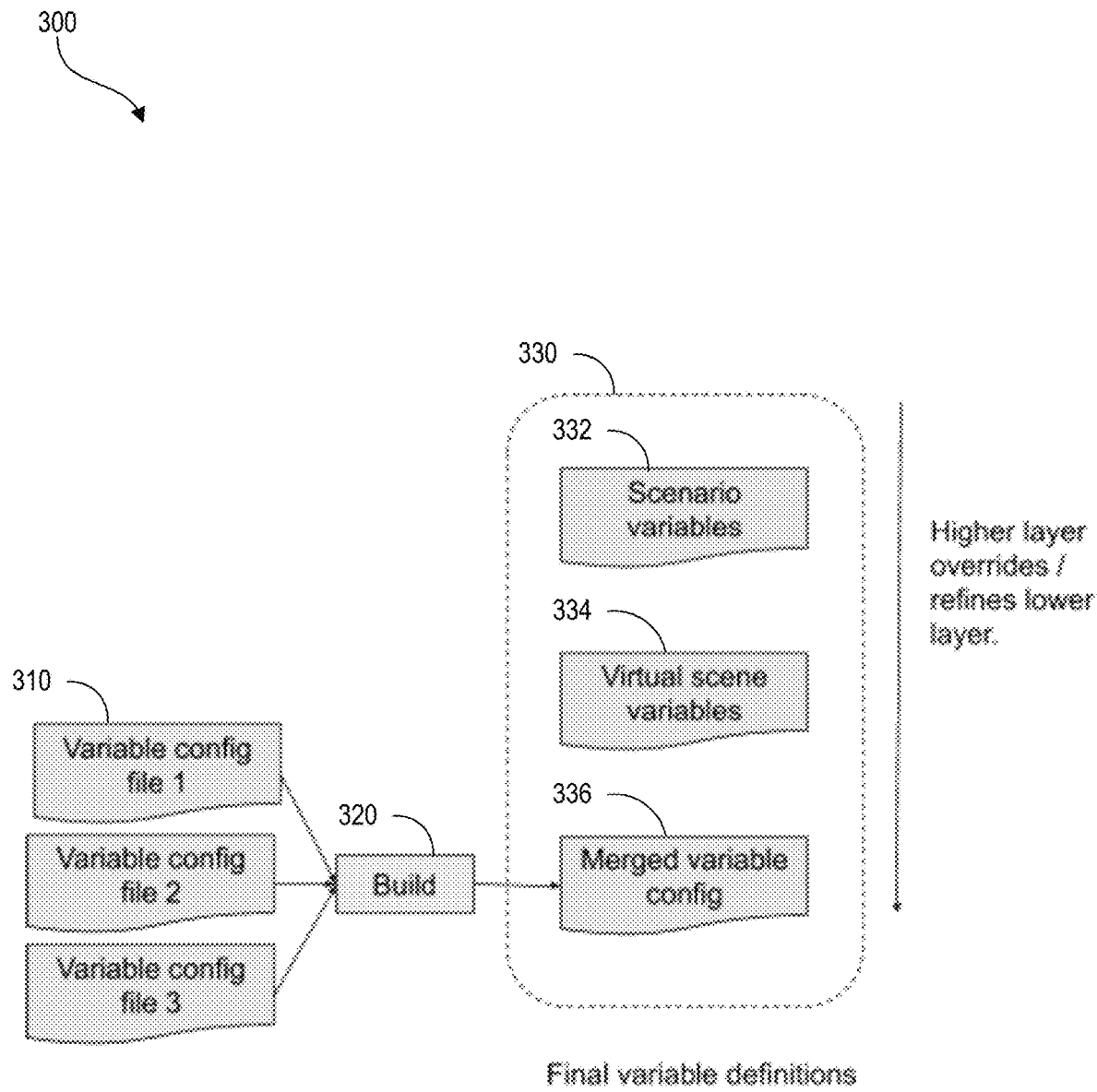
FIG. 3 illustrates a block diagram showing refinement and overriding of variables, according to certain aspects of the present disclosure.

FIG. 3 illustrates a block diagram 300 showing refinement and overriding of variables by the variable system, in accordance with some aspects. In some cases, there can be several variable configuration files 310 as illustrated. In some implementations, a variable configuration file can be a JavaScript Object Notation (JSON) file. A builder 320 can merge the variable configuration files (if there are multiple files) together into a merged variable configuration file (or layer) 336. Layered variable definitions 330 can include a top layer 332 with scenario variables (sometimes referred to as the scenario variable layer), a middle layer 334 with virtual scene variables (sometimes referred to as the scene variable layer), and a bottom layer 336 with configuration file variables (sometimes referred to as the configuration layer). As described herein, a higher layer can override or refine the same variable in one or more lower layers. Variables from a lower layer can be applied first, so a variable from a higher layer can refine or override the same variable from a lower layer. For example, the variable system can determine variable specifications from a bottom layer first and subsequently determine variable specifications from a top layer. The variable system can determine final variable specifications for a simulation by overriding or refining the variable specifications from the bottom layer based on the variable specifications from the top layer.

An example of layered variable definition approach is illustrated in FIG. 4. The scenario layer 410 can include definitions for a variable "timing_delay," which can represent a delay in the delivery of messages, and a variable "position_noise," which can represent an error in the position of the AV (as explained below). The variable "timing_delay" can be a list, and the variable "position_noise" can be a probability distribution corresponding to the noise in the position data. As is indicated by the setting of an override flag 412, the variable "position_noise" is subject to being overridden. The virtual scene layer 420 can include a definition for the variable "vehicle_speed," which can represent the speed of the AV as selected from a list. The configuration layer 430 can include a definition for the variable "position_noise." During simulation, the standard deviation attribute of the "position_noise" variable can be overridden to follow the definition from the upper scenario layer (standard deviation=1) rather than the definition from the lower configuration layer (standard deviation=2). In some cases, instead of the override flag 412 being set to "True," a refinement flag can be set to "True" causing the values of the variable to be refined.

For example, if the bottom definition defines a list [1, 2, 3, 4, 5], a top definition can refine the list to [3, 2, 5], [2, 4], [1], etc. (such as, all possible subsets with the order not being relevant). Overriding can allow a variable to change its specification completely, whereas refinement can also achieve this goal while ensuring that the new variable is well-defined or well-behaved in that its values are a subset of the original values.

In some implementations, when a variable is queried at runtime (during simulation), the variable system can always yield the variable's definition from the upper layer. Advantageously, the layered construction of the variable can be decoupled from its querying, and the component that queries the variable remains agnostic of what specific layers that variable is defined in. This can facilitate changing the specification of a variable by adding upper layers as opposed to changing its specification directly, and without having to change the software component that queries the variable at runtime. As a result, the variable system can allow defining different types of variables (such as, lists, ranges, probability distributions, etc.) in a layered manner permitting override and refinement and in a data type-safe manner, while decoupling the layered nature of variable construction from the later runtime query of the variable's specification.

Figure 5:
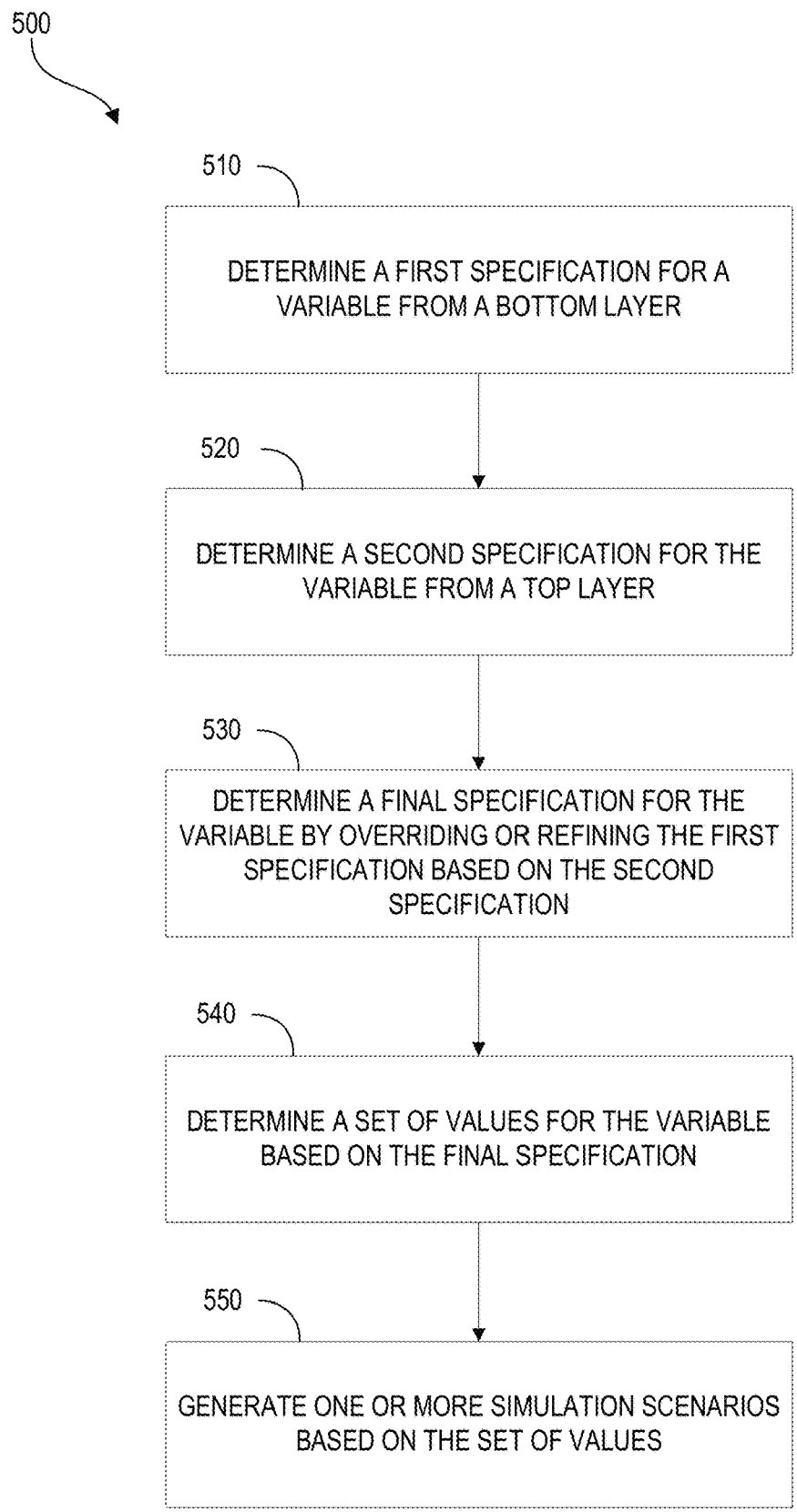
FIG. 5 illustrates a process for refinement and overriding of variables, according to certain aspects of the present disclosure.

FIG. 5 illustrates a process 500 for the refinement and overriding of variables, in accordance with some aspects. The process 500 can be implemented by the variable system. In block 510, the process 500 can determine a first specification for a variable from a first layer, which can be a bottom layer. In block 520, the process 500 can determine a second specification for the variable from a second layer, which can be a top layer. The second layer can have higher priority than the first layer. In block 530, the process 500 can determine a final specification for the variable using the first specification for the variable from the first layer and the second specification for the variable from the second layer. In block 530, the process 500 can also override or refine at least one attribute of the variable in the first specification based on an attribute of the variable in the second specification. As described herein, there can be more than two layers defining the variables. For example, there can be a bottom layer (such as, the merged variable configuration layer 336), a middle layer (such as, the scene variable layer) 334, and a top layer 332 (such as, the scenario variable layer). The process 500 can check at each intermediate step that a valid refinement or override is obtained based on the result(s) of the previous step or layer. In block 540, the process can determine a set of values for the variable based on the final specification for the variable. In block 550, the process 500 can generate one or more simulation scenarios based on the set of values for the variable.

The variable system can evaluate (or sample) the variables at runtime. Once the variables have been specified, the variable system can facilitate sampling values for the variables. Sampling a variable can include, for instance, selecting a value from a list of possible values, selecting a value from a probability distribution, or the like. The variable system can distinguish between two types of variables: initialization variables and runtime variables. An initialization variable can be a variable whose value is determined once at the start of a simulation and remains constant throughout the simulation. A runtime variable can be a variable that should be sampled at runtime to generate multiple values. Regardless of whether the variable is an initialization or runtime variable, the samples should be consistent with the variable's specification, including ensuring that the data type of the variable (such as, integer, double, list, etc.) is the same across all layers, sampling a list yields an element from that list, sampling a normal distribution yields a normally-distributed value, or the like.

The variable system can facilitate additional validation. For a discrete variable, the variable system can enumerate the possible values and validate that the sampled value is one of the possible values. For instance, the variable system can select a sample from a list. As another example, the variable system can ensure that the sample is positive for a variable that can only take on positive values (such as, speed).

For a continuous variable, such as a probability distribution, the variable system can permit any refinement to be a valid refinement. This approach can be taken because the probability distribution is theoretically unbounded. For instance, a constant (such as, 3) or a list of values (such as, [4, 7, 8.1]) can be valid refinements because these values form a subset of values of the probability distribution.

In some implementations, for a probability distribution variable, the variable system can create certain arbitrary bounds even though the variable is theoretically unbounded. For example, a lower bound of zero can be selected for a continuous variable that can only take one positive values (such as, speed). An upper bound representing the maximum possible value of the variable can be selected. For instance, a lower bound of 0 m/s (not inclusive) and an upper bound of 27 m/s (inclusive or not inclusive) can be selected for a normally-distributed speed variable. When refining such speed variable, any set of values that are within the selected bounds can be determined as being valid. For instance, a constant 3 and a list [5.6, 7, 20, 23.5] are valid refinements, but a constant −3 and lists [3, 7, 30] or [5, 8,−6, 20] are not.

The variable system can guarantee a deterministic output in the sampling of variables. For instance, two runs of the same simulation should yield the exact same pseudo-random sequences (or exact same values) for each variable. If this were not the case, the simulation system may not be useful for performing the testing. The variable system can use a master seed to guarantee such deterministic output. The master seed (master_seed) can be used to seed the variable system's internal pseudo-random number generator (PRNG) (or random number generator), from which the PRNGs of individual variables (variable_seed) can be derived. The variable system can also guard against introducing errors due to the order of sampling different variables. For instance, suppose that in one run variables X, Y, Z, all from different definitions, are constructed with the seeds SX, SY, SZ. Further, suppose that in a second run the order the variables are constructed in is X, Z, Y. As a result, in the second run Z would use SY as the seed and Y, SZ as the seed, yielding different random sequences for Y and Z. So that the order in which variables are constructed does not affect their resulting sequences of random samples, a variable's seed could be not just a function of the master seed, but also of the variable's name (or other data that identifies the variable). A variable's seed can be defined as follows:

$$\text{variable\_seed} = \text{master\_seed XOR hash(name(variable))} \quad (1)$$

where hash(name(variable)) corresponds to a hash value of the variable's name. This seed can be used to determine a random number for sampling the variable as follows:

$$\text{PRNG(variable)} = \text{PRNG(variable\_seed)} \quad (2)$$

Figure 6:
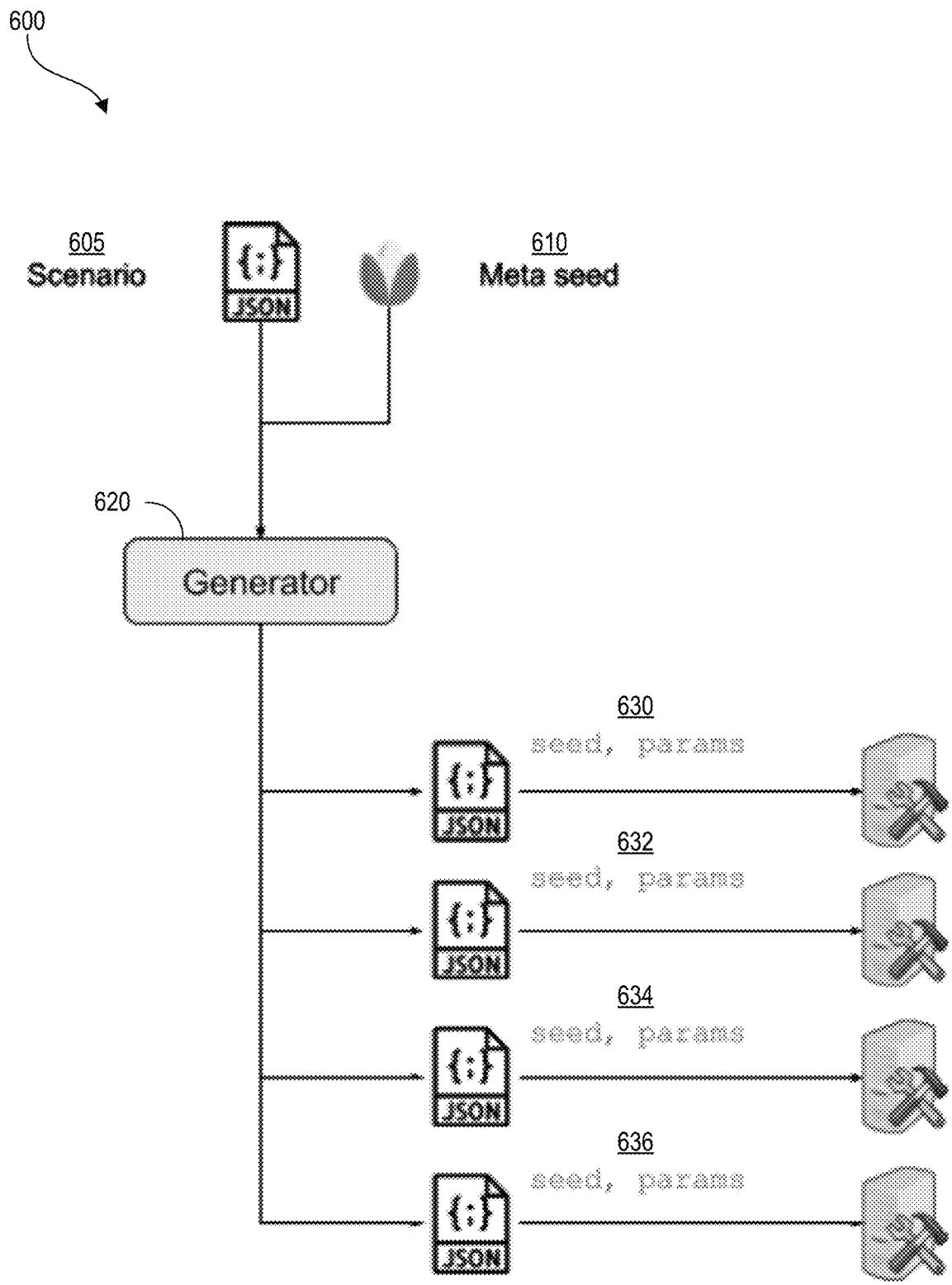
FIG. 6 illustrates a block diagram showing producing deterministic output, according to certain aspects of the present disclosure.

FIG. 6 illustrates a block diagram 600 illustrating the production of a deterministic output, in accordance with some aspects. A scenario specification 605 and a meta seed 610 can be used by a generator 620 (which can be similar to the scenario generator 220) to generate scenario variations 630, 632, 634, and 638 of the scenario specification 605. The different scenario variations 630, 632, 634, and 638 can be assigned different master seeds, which can be used to generate different variable seeds (for example, using Equation 1) and to sample the variables (for example, using Equation 2). The meta seed 610 can govern the sampling of the variables and the generation of the master seeds. Given identical inputs, the generator 620 can produce the same scenario variations. As a result, the meta seed 610 can be used to guarantee that the generator 620 behaves deterministically. The meta seed 610 can be a parameter that an engineer can tweak when invoking the generator 620, should the engineer wish to experiment with a different set of variation outcomes.

Figure 7:
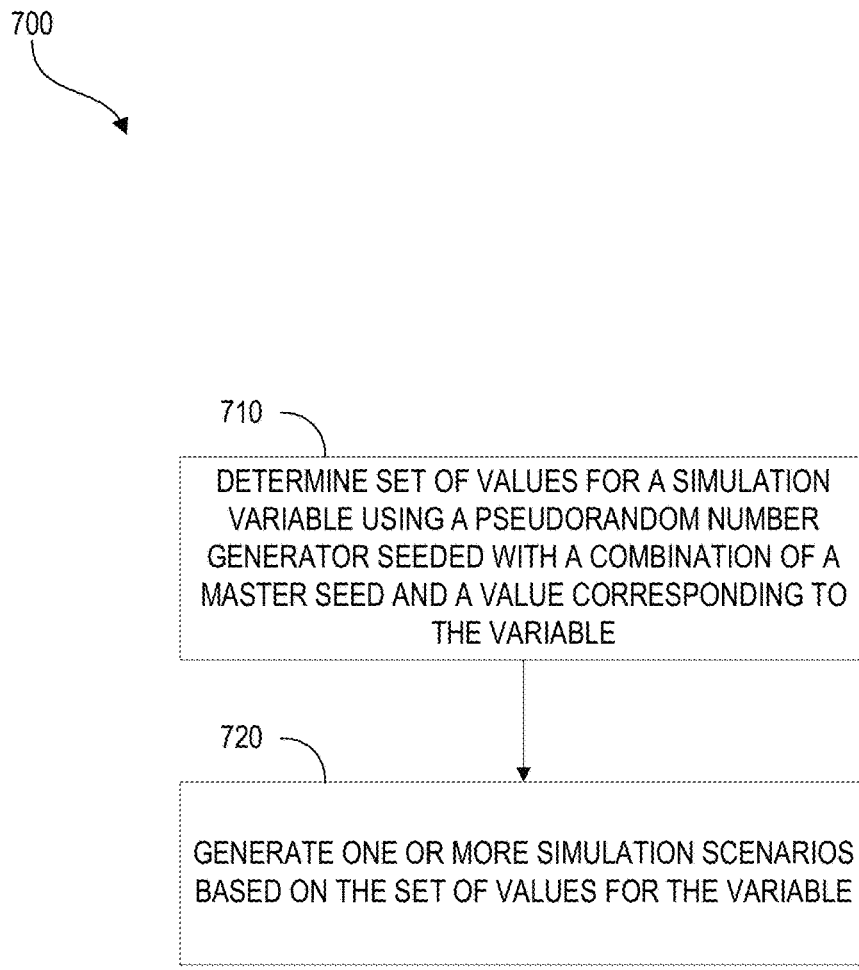
FIG. 7 illustrates a process for deterministic sampling of variables, according to certain aspects of the present disclosure.

FIG. 7 illustrates a process 700 for the deterministic sampling of variables, in accordance with some aspects. The process 700 can be implemented by the variable system. In block 710, the process 700 can use a combination of a master seed and an identification of a variable (such as, variable name) to deterministically sample the variable. The process 700 can sample the variable using a pseudorandom number generator seeded with the combination. In block 720, the process 700 can generate one or more simulation scenarios using a set of values determined during the sampling.

The variable system can sample variables at runtime in a deterministic and order-independent way. Having specified the variables involved in a simulation, the variable system can provide different mechanisms to sample those variables at runtime in a deterministic, controlled, and type-safe manner. With the ability to specify variables and sample them at runtime, the variable system can be used to define variables in different simulation components, thereby making the specification more expressive. That is, the specification can be written once, but the variable system can be utilized to capture many different simulation behaviors.

Figure 8:
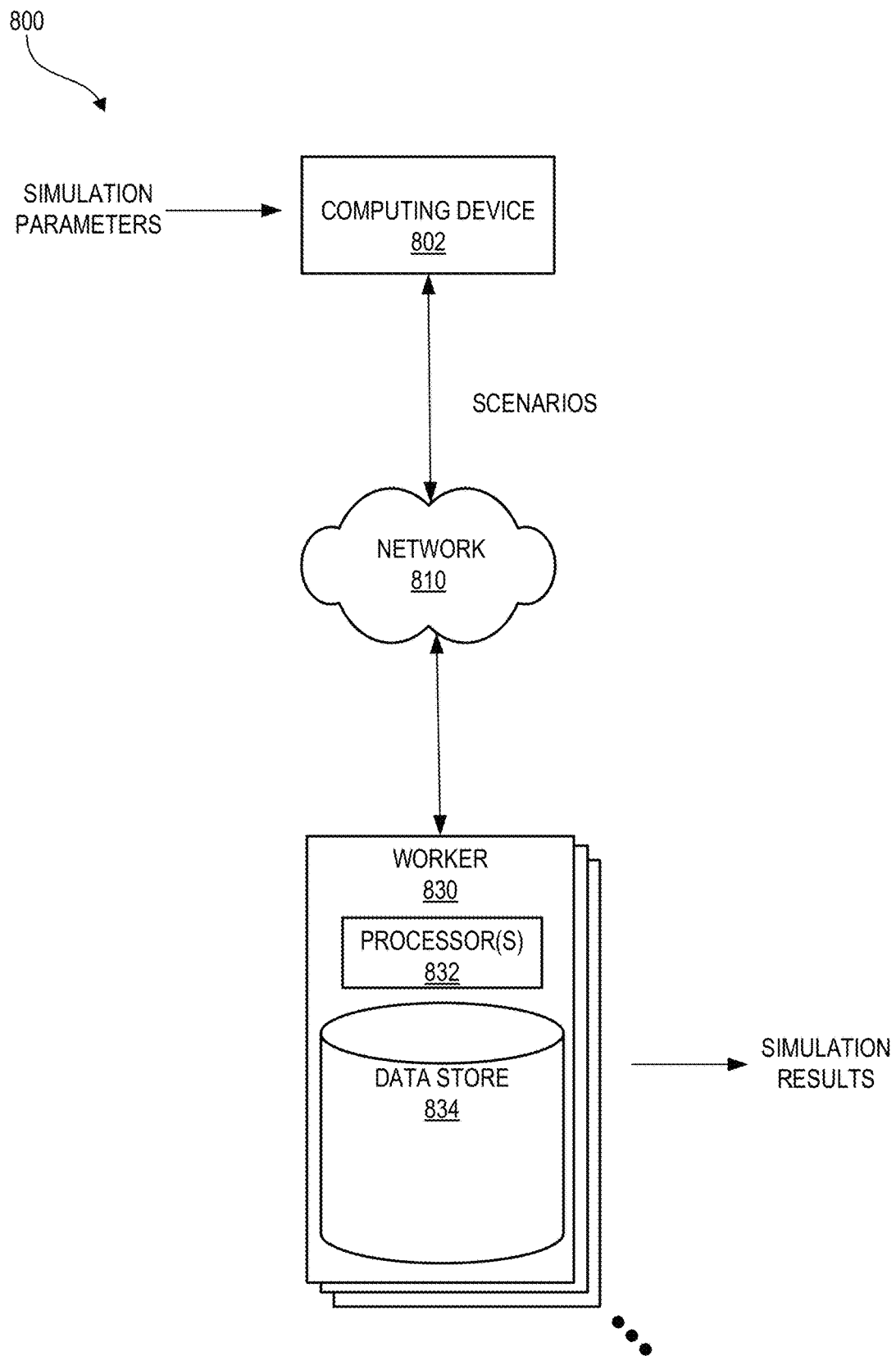
FIG. 8 illustrates a block diagram showing a simulation environment for the testing of AVs, according to certain aspects of the present disclosure.

With reference to FIG. 8, which illustrates a block diagram 800 for testing an AV, the variable system can be implemented by a computing device 802. For example, instructions (such as, code) for the variable system can be executed by the computing device 802. The computing device 802 can be any of the computing devices described herein. As described herein, the variable system can receive as inputs one or more simulation parameters (such as, scenario specification, scene, variable configuration file(s), or the like) and output scenarios for simulating the operation of an AV. The scenarios (which can be numerous, such as hundreds or thousands) can be simulated by one or more computing devices or workers 830, which can be cloud devices (or, in some cases, local devices). Any of the workers 830 can be physical computing devices with one or more processors 832 and data storage 834 or virtual devices implemented by one or more physical computing devices. The computing device 802 can communicate the scenarios to the one or more workers via a network 810, which can be similar to the network 110. The one or more workers 830 can simulate the operation of the AV according to the scenarios and produce simulation results. In some implementations, the computing device 802 can be a cloud device. In some variations, the computing device 802 (or another local device or devices) can execute the scenarios to perform the simulation.

Simulation Variations

Given a simulation specification, including the variables involved, the variable system can generate variations of the simulation to test the same simulation under different conditions. This can improve the test coverage and provide more confidence in the operation of the AV. The variable system can generate simulation variations to change the values of the simulation's variables at runtime.

Random sampling can be used to generate simulation variations by changing the variable system's master seed. A different master seed can yield a completely different set of random samples, thereby resulting in a simulation with a different set of conditions. For example, suppose that a simulation has two variables: a vehicle's speed S and a trigger's activation time T (such as, for activating an event). S can be defined as a normal probability distribution, and T can take on a finite set of values from a list:

S=Normal(mean, standard deviation)

T=[1.5, 4.0, 8.5]

At runtime, S can be sampled to determine the vehicle's speed for a particular simulation. The variable system can generate a random sample that is normally-distributed based on the variable's specification (mean and standard deviation for the normal probability distribution). Similarly, the variable system can select one of the possible values for T at random to determine the trigger's activation time. Changing the master seed can yield a different set of samples, thereby generating a different variation of the same simulation. In this particular example, since S is a continuous random variable, there are an infinite number of choices, and the variable system can facilitate exploring each and every one of those choices to verify that the simulation is well-behaved under variations of S and T. Another possibility of sampling is to assign a fixed value to a variable (such as, T=4.0).

While random sampling is quite simple, it may not provide much control over the outcome. Parameter sweeping can be used to generate variations that allows for greater control. The variable system can allow parameter sweeping by overriding or refining one or more variable specifications at runtime. As described herein, overriding or refining allows for, at the time of simulation, adding a top layer of variables that refines the variable specifications in lower layers to take on specific values. Because the variable system can yield a variable's upper layer specification when it is queried, the variable construction that takes place during the generation of variations is isolated, and the underlying software components are agnostic to and unaffected by this logic.

For example, suppose there is a simulation specification with two variables, X and Y, defined as a list of values:

X=[1, 2, 3, 4, 5]

Y=[6, 7, 8]

A simulator can take this simulation specification and a parameter sweeping configuration that determines how the variables in the simulation are to be sampled to generate scenario variations. Various sampling strategies can be defined to include, among others, one or more of the following:

Random sampling: pick one of the values at random;

Fixed step: step through variable's values with a given step size;

Stratified sampling: divide the variable's values into sets of equal (or in some cases, unequal) size, then randomly sample from each set.

For example, a scenario generator (such as the generator 220 of FIG. 2), can generate scenarios defined by specifications in a "scenario file" (which may define the above two variables X, Y for simulation) via the following command:

gen_scenario_job.py=<scenario file>—sweep<sweep configuration file>

This can cause the scenario generator to perform a variable sweep in accordance with the specifications in the "sweep configuration" file. Suppose that this file specifies a parameter sweep over the variables X, Y in the above example using a fixed step sampling strategy with the step size of one. This could be expressed in the "sweep configuration" file as follows:

X: fixed step 1
Y: fixed step 1

Such parameter sweep can yield all possible combinations of X and Y as follows:

{X=1, Y=6}, {X=1, Y=7}, . . . , {X=2, Y=6}, {X=2, Y=7}, . . . , {X=5, Y=8}

In another example, the "sweep configuration" file can specify random sampling for X (such as, three randomly picked values) and a parameter sweep over the variable Y using a fixed step sampling strategy with the step size of two. This could be expressed in the "sweep configuration" file as follows:

X: random 3
Y: fixed step 2

Such parameter sweep can yield the following combinations of X and Y:

{X=1, Y=6}, {X=1, Y=8}, {X=3, Y=6}, {X=3, Y=8}, {X=5, Y=6}, {X=5, Y=8}

Once the specific values of X and Y for a given variation are determined, an upper layer can be added with the refinements of X and Y and the result is run through the simulator. As described herein, the variable system can yield a variable's upper layer specification. As a result, the remainder of the simulation may be completely agnostic of the generation of variations, and the underlying software components may remain unaffected.

A default behavior for variables that are not explicitly swept can be provided. Following the above definitions of variables X, Y, if an engineer is only interested in sweeping X, there may be two options regarding Y as follows:

1) give Y a fixed value so that the variable X is tested in isolation (every other part of the simulation would behave identically across variations);
2) let Y vary randomly for more variety in the simulation.

The variable system can accomplish the first option by fixing the variable system's master seed across the variations of X as identical master seeds would yield identical pseudo-random number sequences for the remainder of the variables, including Y. The latter choice can be accomplished by changing the variable system's master seed across the variations. Different master seeds would cause the remainder of the variables (including Y) to generate different pseudo-random number sequences.

With parameter sweeping, the simulator can provide more control over how simulation variations are generated, while giving a sensible default behavior for variables that are not explicitly swept. The variable system can implement parameter sweeping so that underlying software components need not be changed or user intervention is not required.

The simulator can test the behavior of an AV in synthetic scenarios. Synthetic scenarios may be useful to test situations that are difficult or dangerous to stage on a real-world road test. For example, creeping over an opposite-way lane to maneuver around a disabled vehicle on the road. A downside of synthetic scenarios, however, can be that all values in the simulation are perfect or well-behaved. For instance, in the simulation the exact position and heading of every other vehicle on the road is known with exact precision, as are the distances to each of those vehicles. In a real-world road test, sensor noise and other deviations alter the state with which the AV operates, and these deviations should be taken into account in the simulation to correctly test the behavior of the AV. It would be advantageous to test synthetic scenarios under the same less-than-ideal circumstances as a real-world road test.

This can be achieved by injecting noise into various components. Following the previous example, noise can be injected into the output of a perception system of the AV so that the positions and distances to other vehicles on the road of the synthetic scenario are no longer perfectly accurate. The noise can be modeled after real-world observations, which may be collect from sensors in road tests. With the variable system, there can be defined a variable that is incorporated into the output of the perception system. The variable can be defined as having the same probability distribution as the observed real-world data so that the simulation yields statistically similar results. Thus, the simulation can run in the less-than-ideal circumstances observed in road tests, as facilitated by the variable system.

As with the perfect accuracy of the perception of other vehicles on the road in a synthetic simulation, the timing of messages in a simulation may also be unrealistically accurate. The AV can be a distributed system where various software components communicate with each other through message passing. Due to thread scheduling and other sources of non-determinism from the operating system of the AV, the timing of those messages may vary. However, in a lock-step simulation, there is complete control of time, and messages can appear to be produced instantly and with exact timing accuracy. While the deterministic nature of the simulation is desirable, message timing can be varied to mimic what is observed in real-world road tests.

The variable system can achieve these goals. The timing of messages from our real-world road tests can be measured. One or more variables can be defined with probability distributions fitted to those measurements. As a result, the simulation can yield message timing that is statistically similar to what is observed in road tests.

Applications of the Variable System

The variable system can allow defining variables in various components of simulation in a type-safe manner. Its layered approach can allow changing the specification of those variables under the rules of override and refinement, while leaving the software components that query those variables at runtime unaffected. The variable system can facilitate sampling the variables at runtime while ensuring that the resulting sequences of samples are deterministic. From these properties derive the many applications of the system disclosed herein, including without limitation simulation variations, noise injection, and realistic message timing. These applications can make the simulator more expressive and more powerful by virtue of being able to test the same scenario under many different conditions. This can allow engineers to be more exhaustive in the tests, and therefore be more confident in the performance of the AV. These benefits can be achieved while making the system easily manageable by the engineers, without requiring user intervention and without having to change the individual software components of the simulator. The variable system can bridge the gap between the software components and the applications disclosed herein.

While some embodiments of the variable system have been described in the context of testing an AV, the variable system can be used for testing the operation of any autonomous system or semi-autonomous system. Using the approaches described herein, the performance of any autonomous or semi-autonomous system can be simulated.

In regard to the figures described herein, other embodiments are possible, such that the above-recited components, steps, blocks, operations, and/or messages/requests/queries/instructions are differently arranged, sequenced, sub-divided, organized, and/or combined. In some embodiments, a different component may initiate or execute a given operation.

Example Embodiments

Some example enumerated embodiments are recited in this section in the form of methods, systems, and non-transitory computer-readable media, without limitation.

In certain aspects, a non-transitory computer readable storage medium can store instructions that, when executed by one or more processors, cause the one or more processors to perform a method of generating one or more scenarios for simulating an operation of an autonomous vehicle. The method can include: determining a first specification for a simulation variable from a first layer that defines one or more variables; determining a second specification for the simulation variable from a second layer that defines one or more variables, the second layer being associated with a higher priority than the first layer; determining a final specification for the simulation variable by overriding or refining the first specification based on the second specification; determining a set of values for the simulation variable based on the final specification for the simulation variable; and generating the one or more scenarios for simulating the operation of the autonomous vehicle based on the set of values for the simulation variable and without requiring any user changes for the set of values.

The method of the preceding paragraph can include any combination or sub-combination of the following features: where the first layer comprises a virtual scene layer and the second layer comprises a scenario layer that defines one or metrics to be evaluated during the simulation; where determining the final specification for the simulation variable by overriding comprises replacing an attribute of the simulation variable from the first specification with another attribute from the second specification, and where the set of values for the simulation variable is determined based on the another attribute; where determining the first specification for the simulation variable comprises defining a set of possible values for the simulation, and where determining the final specification for the simulation variable by refining the first specification comprises defining a subset of the set of possible values based on the second specification; where determining the final specification for the simulation variable by refining comprises refining an attribute of the simulation variable from the first specification, and where determining the set of values for the simulation variable comprises selecting one or more subsets of values from a set specified by the attribute of the simulation variable; where refining the attribute of the simulation variable from the first specification comprises determining at least one bound for the values of the simulation variable; where the method further comprises determining a third specification for the simulation variable from a third layer that defines one or more variables, the third layer being associated with a lower priority than the first layer, and where determining the final specification for the simulation variable comprises overriding or refining the third specification based on the first specification for the simulation variable from the first layer; where the third layer comprises a variable configuration layer; where the method further comprises merging a plurality of variable configuration files into the variable configuration layer; and where determining the final specification for the simulation variable by overriding or refining the first specification based on the second specification for the simulation variable comprising verifying that a first data type for the simulation variable from the first specification matches the second data type for the simulation variable from the second specification.

In certain aspects, a method of generating one or more scenarios for simulating an operation of an autonomous vehicle can include: determining a first specification for a simulation variable from a first layer that defines one or more variables; determining a second specification for the simulation variable from a second layer that defines one or more variables, the second layer being associated with a higher priority than the first layer; determining a final specification for the simulation variable by overriding or refining the first specification based on the second specification; determining a set of values for the simulation variable based on the final specification for the simulation variable; and generating the one or more scenarios for simulating the operation of the autonomous vehicle based on the set of values for the simulation variable.

The method of the preceding paragraph can include any combination or sub-combination of the following features: where the first layer comprises a virtual scene layer and the second layer comprises a scenario layer that defines one or metrics to be evaluated during the simulation; where determining the final specification for the simulation variable by overriding comprises replacing an attribute of the simulation variable from the first specification with another attribute from the second specification, and where the set of values for the simulation variable is determined based on the another attribute; where determining the first specification for the simulation variable comprises defining a set of possible values for the simulation, and where determining the final specification for the simulation variable by refining the first specification comprises defining a subset of the set of possible values based on the second specification; where determining the final specification for the simulation variable by refining comprises refining an attribute of the simulation variable from the first specification, and where determining the set of values for the simulation variable comprises selecting one or more subsets of values from a set specified by the attribute of the simulation variable; where refining the attribute of the simulation variable from the first specification comprises determining at least one bound for the values of the simulation variable; where the method further comprises determining a third specification for the simulation variable from a third layer that defines one or more variables, the third layer being associated with a lower priority than the first layer; and where determining the final specification for the simulation variable comprises overriding or refining the third specification based on the first specification for the simulation variable from the first layer; where the third layer comprises a variable configuration layer; where the method further comprises merging a plurality of variable configuration files into the variable configuration layer; and where determining the final specification for the simulation variable by overriding or refining the first specification based on the second specification for the simulation variable comprising verifying that a first data type for the simulation variable from the first specification matches the second data type for the simulation variable from the second specification.

In certain aspects, a non-transitory computer readable storage medium can store instructions that, when executed by one or more processors, cause the one or more processors to perform a method of generating one or more scenarios for simulating an operation of an autonomous vehicle. The method can include: determining a plurality of sets of values for a plurality of simulation variables, each of the simulation variables associated with a plurality of possible values, the determining comprising, for each simulation variable of the plurality of simulation variables, using a pseudorandom number generator seeded with a combination of a master seed and an identification of the simulation variable to determine a set of values for the simulation variable, thereby facilitating a deterministic and order-independent sampling of the plurality of simulation variables such that that the simulation variable is assigned same set of values for different executions of the same simulation of the operation of the autonomous vehicle; and generating the one or more scenarios for simulating the operation of the autonomous vehicle based on the plurality of sets of values determined for the plurality of simulation variables.

The method of the preceding paragraph can include any combination or sub-combination of the following features: where the identification of the simulation variable is associated with a name of the simulation variable; where the identification of the simulation variable comprises a hash of the name of the simulation variable; where the combination comprises an exclusive or (XOR) of the master seed and the hash of the name of the simulation variable; where the set of values for the simulation variable comprises a random value from the plurality of possible values for the simulation variable; where the set of values for the simulation variable comprises a plurality of subsets of values from the plurality of possible values for the simulation variable, and where the one or more scenarios comprise a plurality of scenarios associated with each subset of the plurality of subsets of values; where the plurality of simulation variables comprises a first simulation variable and a second simulation variable, and where the method comprises determining a first set of values for the first simulation variable and a second set of values for the second simulation variable by varying the master seed; where the plurality of simulation variables comprises a first simulation variable and a second simulation variable, and where the method comprises determining a first set of values for the first simulation variable and a second set of values for the second simulation variable by maintaining a constant value of the master seed; where a simulation variable from the plurality of simulation variables comprises a probability distribution corresponding to errors associated with determining position of the autonomous vehicle or corresponding to delays associated with messages communicated between components of the autonomous vehicle; and where the method further comprises overriding or refining a set of values for a simulation variable based on specifications in first and second layers defining the simulation variable.

In certain aspects, a method of generating one or more scenarios for simulating an operation of an autonomous vehicle can include: determining a plurality of sets of values for a plurality of simulation variables, each of the simulation variables associated with a plurality of possible values, the determining comprising, for each simulation variable of the plurality of simulation variables, using a pseudorandom number generator seeded with a combination of a master seed and an identification of the simulation variable to determine a set of values for the simulation variable; and generating the one or more scenarios for simulating the operation of the autonomous vehicle based on the plurality of sets of values determined for the plurality of simulation variables.

The method of the preceding paragraph can include any combination or sub-combination of the following features: where the identification of the simulation variable is associated with a name of the simulation variable; where the identification of the simulation variable comprises a hash of the name of the simulation variable; where the combination comprises an exclusive OR (XOR) of the master seed and the hash of the name of the simulation variable; where the set of values for the simulation variable comprises a random value from the plurality of possible values for the simulation variable; where the set of values for the simulation variable comprises a plurality of subsets of values from the plurality of possible values for the simulation variable, and where the one or more scenarios comprise a plurality of scenarios associated with each subset of the plurality of subsets of values; where the plurality of simulation variables comprises a first simulation variable and a second simulation variable, and where the method comprises determining a first set of values for the first simulation variable and a second set of values for the second simulation variable by varying the master seed; where the plurality of simulation variables comprises a first simulation variable and a second simulation variable, and where the method comprises determining a first set of values for the first simulation variable and a second set of values for the second simulation variable by maintaining a constant value of the master seed; where a simulation variable from the plurality of simulation variables comprises a probability distribution corresponding to errors associated with determining position of the autonomous vehicle or corresponding to delays associated with messages communicated between components of the autonomous vehicle; and where the method further comprises overriding or refining a set of values for a simulation variable based on specifications in first and second layers defining the simulation variable.

In other embodiments, a system or systems may operate according to one or more of the methods and/or computer-readable media recited in the preceding paragraphs. In yet other embodiments, a method or methods may operate according to one or more of the systems and/or computer-readable media recited in the preceding paragraphs. In yet more embodiments, a computer-readable medium or media, excluding transitory propagating signals, may cause one or more computing devices having one or more processors and non-transitory computer-readable memory to operate according to one or more of the systems and/or methods recited in the preceding paragraphs.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of one or more embodiments can be modified, if necessary, to employ the systems, functions, and concepts of the various references described above. These and other changes can be made in light of the above Detailed Description. While the above description describes certain examples, and describes the best mode contemplated, no matter how detailed the above appears in text, different embodiments can be practiced in many ways. Details of the system may vary considerably in its specific implementation. As noted above, particular terminology used when describing certain features should not be taken to imply that the terminology is being redefined herein to be restricted to any specific characteristics, features with which that terminology is associated. In general, the terms used in the following claims should not be construed to limit the scope the specific examples disclosed in the specification, unless the above Detailed Description section explicitly defines such terms. Accordingly, the actual scope encompasses not only the disclosed examples, but also all equivalent ways of practicing or implementing the claims. To reduce the number of claims, certain aspects of the present disclosure are presented below in certain claim forms, but the applicant contemplates other aspects of the present disclosure in any number of claim forms. For example, while only one aspect of the present disclosure is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A non-transitory computer readable storage medium storing instructions that, when executed by one or more processors, cause the one or more processors to perform a method of generating one or more scenarios for simulating an operation of an autonomous vehicle, the method comprising:

determining a first specification for a simulation variable from a first layer that defines one or more variables, wherein the first specification defines variables outside of a scene or scenario definition;

determining a second specification for the simulation variable from a second layer that defines one or more variables, the second layer being associated with a higher priority than the first layer, wherein the second specification defines variables in the scene or scenario definition, and wherein specifications of the higher priority take precedence over specifications of the lower priority such that, for a variable included in both the first layer and the second layer, the variable is defined based on the second specification;

determining a final specification for the simulation variable by overriding or refining the first specification based on the second specification;

determining a set of values for the simulation variable based on the final specification for the simulation variable;

generating the one or more scenarios for simulating the operation of the autonomous vehicle based on the set of values for the simulation variable and without requiring any user changes for the set of values; and simulating, by the one or more processors, the operation of the autonomous vehicle using at least one of the one or more scenarios.

2. The storage medium of claim 1, wherein the first layer comprises a virtual scene layer and the second layer comprises a scenario layer that defines one or metrics to be evaluated during the simulation.

3. The storage medium of claim 1, wherein determining the final specification for the simulation variable by overriding comprises replacing an attribute of the simulation variable from the first specification with another attribute from the second specification, and wherein the set of values for the simulation variable is determined based on the another attribute.

4. The storage medium of claim 1, wherein determining the first specification for the simulation variable comprises defining a set of values for the simulation, and wherein determining the final specification for the simulation variable by refining the first specification comprises defining a subset of the set of values based on the second specification.

5. The storage medium of claim 1, wherein determining the final specification for the simulation variable by refining comprises refining an attribute of the simulation variable from the first specification, and wherein determining the set of values for the simulation variable comprises selecting one or more subsets of values from a set specified by the attribute of the simulation variable.

6. The storage medium of claim 5, wherein refining the attribute of the simulation variable from the first specification comprises determining at least one bound for the values of the simulation variable.

7. The storage medium of claim 1, wherein:
the method further comprises determining a third specification for the simulation variable from a third layer that defines one or more variables, the third layer being associated with a lower priority than the first layer; and
determining the final specification for the simulation variable comprises overriding or refining the third specification based on the first specification for the simulation variable from the first layer.

8. The storage medium of claim 7, wherein the third layer comprises a variable configuration layer.

9. The storage medium of claim 8, wherein the method further comprises merging a plurality of variable configuration files into the variable configuration layer.

10. The storage medium of claim 1, wherein determining the final specification for the simulation variable by overriding or refining the first specification based on the second specification for the simulation variable comprising verifying that a first data type for the simulation variable from the first specification matches the second data type for the simulation variable from the second specification.

11. A method of generating one or more scenarios for simulating an operation of an autonomous vehicle, the method comprising:

determining a first specification for a simulation variable from a first layer that defines one or more variables, wherein the first specification defines variables outside of a scene or scenario definition;

determining a second specification for the simulation variable from a second layer that defines one or more variables, the second layer being associated with a higher priority than the first layer, wherein the second specification defines variables in the scene or scenario definition, and wherein specifications of the higher priority take precedence over specifications of the lower priority such that, for a variable included in both the first layer and the second layer, the variable is defined based on the second specification;

determining a final specification for the simulation variable by overriding or refining the first specification based on the second specification;

determining a set of values for the simulation variable based on the final specification for the simulation variable;

generating the one or more scenarios for simulating the operation of the autonomous vehicle based on the set of values for the simulation variable; and simulating, by one or more processors, the operation of the autonomous vehicle using at least one of the one or more scenarios.

12. The method of claim 11, wherein the first layer comprises a virtual scene layer and the second layer comprises a scenario layer that defines one or metrics to be evaluated during the simulation.

13. The method of claim 11, wherein determining the final specification for the simulation variable by overriding comprises replacing an attribute of the simulation variable from the first specification with another attribute from the second specification, and wherein the set of values for the simulation variable is determined based on the another attribute.

14. The method of claim 11, wherein determining the first specification for the simulation variable comprises defining a set of values for the simulation, and wherein determining the final specification for the simulation variable by refining the first specification comprises defining a subset of the set of values based on the second specification.

15. The method of claim 11, wherein determining the final specification for the simulation variable by refining comprises refining an attribute of the simulation variable from the first specification, and wherein determining the set of values for the simulation variable comprises selecting one or more subsets of values from a set specified by the attribute of the simulation variable.

16. The method of claim 15, wherein refining the attribute of the simulation variable from the first specification comprises determining at least one bound for the values of the simulation variable.

17. The method of claim 11, wherein:
the method further comprises determining a third specification for the simulation variable from a third layer that defines one or more variables, the third layer being associated with a lower priority than the first layer; and determining the final specification for the simulation variable comprises overriding or refining the third specification based on the first specification for the simulation variable from the first layer.

18. The method of claim 17, wherein the third layer comprises a variable configuration layer.

19. The method of claim 18, further comprising merging a plurality of variable configuration files into the variable configuration layer.

20. The method of claim 11, wherein determining the final specification for the simulation variable by overriding or refining the first specification based on the second specification for the simulation variable comprising verifying that a first data type for the simulation variable from the first specification matches the second data type for the simulation variable from the second specification.

\* \* \* \* \*